United States Patent [19]

Bright et al.

[11] Patent Number: 4,902,549
[45] Date of Patent: Feb. 20, 1990

[54] SEALING AND TRIMMING STRIPS

[75] Inventors: Robert G. Bright; Erich Weimar, both of Viersen, Fed. Rep. of Germany

[73] Assignee: Draftex Industries Limited, Edinburgh, Scotland

[21] Appl. No.: 273,204

[22] Filed: Nov. 18, 1988

[30] Foreign Application Priority Data

Nov. 26, 1987 [GB] United Kingdom ............... 8727690

[51] Int. Cl.⁴ .............................................. E06B 7/16
[52] U.S. Cl. ..................................... 418/122; 29/514; 49/490; 52/716; 428/358
[58] Field of Search ............... 428/122, 358; 49/490; 156/244.12; 52/716; 29/509, 514

[56] References Cited

U.S. PATENT DOCUMENTS

| | | | |
|---|---|---|---|
| 1,486,874 | 3/1924 | Frederick | 428/122 |
| 3,310,928 | 3/1967 | Weimar | 428/122 X |
| 4,112,623 | 9/1978 | McPherson | 428/122 X |
| 4,114,320 | 9/1978 | Pullman | 428/122 X |
| 4,311,747 | 1/1982 | Kruschwitz | 428/122 |
| 4,411,941 | 10/1983 | Azzola | 428/122 |
| 4,676,856 | 6/1987 | Shigeki et al. | 156/244.12 |
| 4,778,705 | 10/1988 | Kuwabara | 428/358 X |

FOREIGN PATENT DOCUMENTS

| | | | |
|---|---|---|---|
| 09233552 | of 1987 | European Pat. Off. | 428/122 |
| 0233552 | 2/1987 | European Pat. Off. | 428/122 |
| 8204475 | 1/1986 | Fed. Rep. of Germany | 428/122 |
| 1545511 | 5/1979 | United Kingdom | 428/122 |
| 2036840 | 7/1980 | United Kingdom | 428/122 |
| 2160920 | 1/1986 | United Kingdom | 428/122 |
| 2172640 | 9/1986 | United Kingdom | 428/122 |

Primary Examiner—Henry F. Epstein
Attorney, Agent, or Firm—Leydig, Voit & Mayer

[57] ABSTRACT

A sealing strip for a vehicle door opening has a generally channel-shaped gripping part supporting a tubular sealing part. Initially, the side walls of the channel of the gripping part are splayed apart so as to enlarge the mouth of the channel. This eases the application of the gripping part to the normal mounting flange surrounding the vehicle door opening. The flange can pass freely between gripping lips on the opposite inside walls of the gripping part. A suitable tool is then employed to press the side walls of the channel towards each other so as to render them substantially parallel, thus pressing the lips into gripping and sealing contact with the flange surfaces, this configuration being therefore resiliently maintained by a metal carrier embedded in the gripping part. One of the sealing lips is particularly advantageous for secondary sealing purposes because it is directed outwardly of the mouth of the channel, unlike the other lips. The initial outward direction of this lip is maintained after fitment of the strip of the flange, because of the initial splaying apart of the side walls of the channel.

9 Claims, 1 Drawing Sheet

SEALING AND TRIMMING STRIPS

BACKGROUND OF THE INVENTION

The invention relates to sealing or finishing strips particularly, though not exclusively, for use on motor vehicle bodies such as for sealing around door and other closable openings thereon.

SUMMARY OF THE INVENTION

According to the invention, there is provided a channel-shaped sealing or finishing strip for fitment to a mounting flange or the like running around an opening closable by a closure member, the sealing strip being generally channel-shaped in cross-section but with the side walls of the channel initially splayed apart to facilitate mounting and being adapted to be thereafter pressed towards each other, by the application of force, into a subsequently retained configuration embracingly gripping the mounting flange.

According to the invention there is also provided a sealing strip, comprising a generally channel-shaped gripping part made of flexible extruded material in which is embedded a channel-shaped metal carrier, sealing and gripping lips mounted on the inside facing side walls of the channel, and a soft tubular sealing section mounted on and running along an outside side wall of the channel of the gripping part, the side walls of the gripping part being initially in splayed apart configuration so as to diverge and provide an enlarged channel mouth for receiving a mounting flange or the like and being adapted for subsequent forced movement towards each other into a generally parallel and thereafter resiliently retained configuration for bringing the lips into gripping and sealing contact with the sides of the mounting flange.

According to the invention there is further provided a method of mounting a channel-shaped strip on a mounting flange running around a closable opening in a motor vehicle body, comprising the step of applying the strip onto the mounting flange while the strip is in splayed-apart configuration with the side walls of the channel diverging so as to provide an enlarged channel mouth, and thereafter pressing the side walls towards each other into a subsequently resiliently retained generally parallel configuration in which the strip embracingly grips the mounting flange.

BRIEF DESCRIPTION OF THE DRAWINGS

Sealing strips embodying the invention for sealing around a door opening on the motor vehicle body, and methods according to the invention of mounting sealing strips around such openings, will now be described, by way of example only, with reference to the accompanying diagrammatic drawing in which.

DESCRIPTION OF PREFERRED EMBODIMENTS

Figure 1:
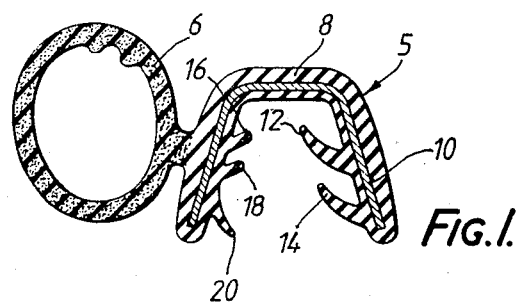
FIG. 1 is a cross-section through the sealing strip before fitment to the vehicle body.

As shown in FIG. 1, the sealing strip is manufactured so as to comprise a generally channel-shaped gripping part 5 and a tubular sealing part 6. The gripping part 5 comprises extruded plastics or rubber material 8 in which is completely embedded a metal core or carrier 10. The carrier may take any suitable form. For example, it may comprise inverted U-shaped metal elements arranged side-by-side along the length of the gripping part so as to define a channel and either connected together by short connecting links or completely disconnected from each other. Instead, however, it could be made from wire looped to and fro from one distal edge of the channel to the other and again extending longitudinally along the gripping part. In each case, however, the purpose of the carrier is to improve the resilience and gripping force of the gripping part on the motor vehicle body, without significantly impairing its flexibility.

The gripping part may be conveniently manufactured by using a cross-head extruder, the extruded plastics or rubber material 8 completely embedding the carrier 10.

The extrusion process is arranged to form lips 12, 14, 16, 18 and 20 on the interior of the channel and each running longitudinally along the full length of the strip. The lips are preferably extruded integrally with the material 8, though need not be of the same hardness; advantageously in fact they are made of softer material than the channel-shaped extruded material 8.

It will be noted that the lips 12 and 14 on one side of the channel are larger than those on the other. It will also be noted that all the lips except the lip 20 are directed generally towards the inverted base of the channel, whereas the lip 20 is directed in the opposite direction—that is, towards the open mouth of the channel.

It will further be noted that, as manufactured and as shown in FIG. 1, the walls of the channel are splayed outwards so as to enlarge the width of the mouth of the channel.

The tubular sealing part 6 is made of soft flexible material such as rubber, preferably of cellular of sponge form. The tubular sealing part may be manufactured separately and then secured to one outside wall of the gripping part 5 by means of adhesive. Instead, however, it could be extruded integrally with the material 8.

Figure 2:
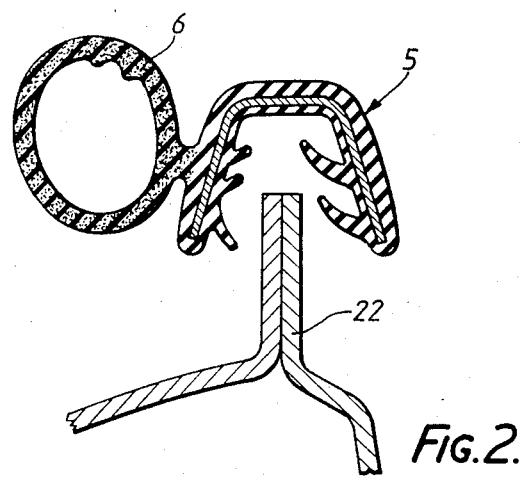
FIG. 2 corresponds to FIG. 1 but shows the strip in the course of being fitted to the vehicle body.

In use, the sealing strip is mounted on the flange which runs around the door opening on the vehicle body, this flange being the flange being formed by the welded joint between the edges of the body panels which meet there. FIG. 2 shows the sealing strip being offered up to this flange 22. This process may be carried out manually or automatically or semi-automatically by robot. As shown in FIG. 2, the splayed-open mouth of the channel of the gripping part 5 is sufficiently wide to enable the flange 22 to pass easily into the channel and between the lips on the opposite channel sides.

Figure 3:
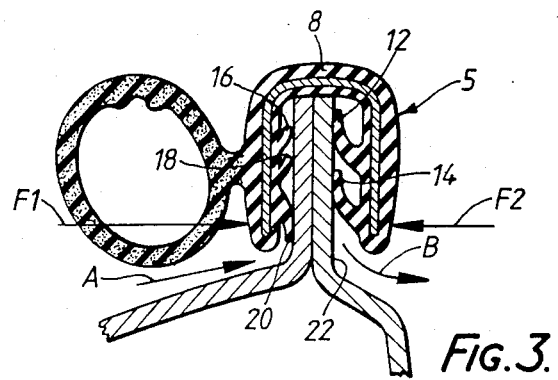
FIG. 3 corresponds to FIG. 2 but shows the sealing strip fitted in position.

The sealing strip is then subjected to a mechanical bending process which bends the channel walls of the gripping part towards each other, so as generally to render them parallel. FIG. 3 shows the cross-sectional shape of the gripping part 5 at the completion of this process, the closing force being applied to the gripping part in the directions and the positions of the arrows F1 and F2. The metal of the carrier 10 permits this bending and thereafter resiliently retains the gripping part 5 in the shape shown in FIG. 3. The lips are thus pressed into contact with the sides of the flange 22.

The frictional force created between the lips and the flange surfaces, which may be increased by the use of softer material for these lips, helps retain the gripping part 5 on the flange and resists forces tending to remove it. The gripping part 5 thus supports the tubular sealing part 6 so as to run around the periphery of the door opening, on its outside, and to be contacted by the edge of the closing door. The door compresses the seal 6 and provides a weatherproof seal.

The lips carry out a secondary sealing function. Thus, if moisture or draughts should pass under the tubular seal 6 in the direction of the arrow A and enter the interior of the channel, the lips prevent the moisture or draughts passing around the inside of the channel, over the distal edge of the flange and thence into the interior of the vehicle in the direction of the arrow B. This secondary sealing function is significantly enhanced by the lip 20 which, being directed in the opposite direction to the remainder of the lips, can carry out its sealing function very much more effectively.

It is only possible to employ the lip 20, with its advantageous direction *outwardly* of the channel (rather than *inwardly* as is the case with the remaining lips) because the gripping part 5 is initially splayed apart when placed over the flange 22 (see FIG. 2). It is not practicable to employ outwardly directed lips (such as the lip 20) in gripping parts where the configuration of the channel is substantially fixed during manufacture. Thus, if the channel of the gripping part 5 *initially* had the configuration which it has in FIG. 3, with substantially parallel side walls, the step of applying it to the flange would cause the lip 20 to become reversed in direction: the frictional force acting on the lip 20 during the assembly process would bend it through 90 degrees or more so that it would point in the opposite direction—that is, it would point towards the base of the channel like the other lips. Its advantageous secondary sealing function would be lost.

If desired, a secondary sealing lip similar to the lip 20 could be positioned on the opposite side wall of the channel of the gripping part 5, that is, on the same side as the lips 12 and 14, this secondary sealing lip being directed towards the mouth of the channel like the sealing lip 20. Such a sealing lip could be in addition to or instead of the sealing lip 20.

Instead of having a single secondary sealing lip 20 on one or each of the channel sides, more than one could be used.

The force applied in the direction of the arrows F1 and F2 in FIG. 3 can be applied by any suitable means, such as manually, automatically or semi-automatically. The force applied in the direction of the arrow F1 can if necessary be applied via the tubular sealing section 6 itself.

In practice, there may be restricted space on the inside of the vehicle in the position where the force acting in the direction of the arrow F2 is to be applied. In such circumstances, a suitable tool for applying the force may provide a rigid metal plate positioned along the side wall of the channel of the gripping part where the force acting in the direction F2 is to be applied; this rigid plate acts as a rigid backing plate against which the force applied in the direction of the arrow F1 can be applied.

Advantageously, a strip of mastic material may be included within the gripping part 5, for example on one of its inside side walls such as instead of one of the lips or adjacent or between the lips. When the sides of the gripping part are forced into parallel configuration, as illustrated in FIG. 3, this mastic is pressed into contact with the side of the flange 22 and its adherence to the flange helps to improve the grip of the gripping part on the flange and also improves sealing. It will be appreciated that this use of mastic is facilitated by the initial splayed apart configuration of the walls of the gripping part. This enables the gripping part to be easily fitted onto the flange without disturbing the mastic.

In order to prevent longitudinal stretching of the sealing strip, an inextensible tape or thread may be embedded within the material of the gripping part.

What is claimed is:

1. A channel-shaped sealing or finishing strip for fitment to a mounting flange running around an opening closable by a closure member, comprising longitudinally extending flexible material in which is embedded a metal carrier, the flexible material being generally channel-shaped in cross-section and defining a lip extending longitudinally of the channel on the inside of one of the sidewalls thereof and directed obliquely from that side wall towards the mouth of the channel from the inside of the channel, the carrier also being generally channel-shaped in cross-section and embedded within the channel-shaped flexible material, the sidewalls of the channel-shaped flexible material and the carrier being initially splayed apart to facilitate mounting on the flange and to prevent any contact between the distal edge of the lip and the flange bending the lip inwardly of the channel, the splayed-apart side walls being adapted to be thereafter pressed towards each other, by the application of force, into a subsequently resiliently retaining configuration embracingly gripping the mounting flange and with the distal edge of the lip pressed into sealing engagement with the mounting flange, the strip being retained on the mounting flange solely by the resilience of the carrier and the frictional contact between the flexible material and the mounting flange.

2. A strip according to claim 1, including at least one further lip made of flexible material running along one inside side wall of the channel and being pressed into contact with the side of the mounting flange upon application of the said force, this further lip being directed obliquely towards the base of the channel.

3. A strip according to claim 1, in which the flexible material is extruded material.

4. A strip according to claim 1, including a sealing part made of flexible sealing material mounted on an outside wall of the channel.

5. A strip according to claim 1, including a sealing part made of flexible sealing material mounted on the outside of that side wall of the channel whose inside carries the said lip.

6. A sealing strip, comprising a generally channel-shaped gripping part made of flexible extruded material in which is embedded a channel-shaped metal carrier, sealing and gripping lips mounted on the inside facing side walls of the channel, and a soft tubular sealing section mounted on and running along an outside side wall of the channel of the gripping part, one of the said lips adjacent the mouth of the channel being directed obliquely from the respective side wall of the channel towards the mouth of the channel from inside the channel, the side walls of the gripping part being initially in splayed apart configuration so as to diverge and provide an enlarged channel mouth for receiving a mounting flange and being adapted for subsequent forced movement towards each other into a generally parallel and thereafter resiliently retained configuration for bringing the lips into gripping and sealing contact with the sides of the mounting flange, the said one lip being directed towards the mouth of the channel in both configurations of the side walls, the strip being retained on the mounting flange solely by the resilience of the carrier and the frictional contact between the flexible material and the mounting flange.

7. A strip according to claim 6, in which at least one other of the lips is directed in the opposite direction to the said one lip.

8. A strip according to claim 6, in which the lip directed towards the mouth of the channel is mounted on the inside of the channel wall on whose outside is mounted the tubular sealing section.

9. A method for mounting a channel-shaped strip on a mounting flange running around a closable opening in a motor vehicle body, the strip comprising a channel-shaped metal carrier embedded in channel-shaped flexible material which also defines a lip on the inside of one of the side walls of the channel adjacent the mouth of the channel and directed towards the mouth of the channel, the method comprising the steps of applying the strip onto the mounting flange while the side walls of the strip are in splayed-apart configuration with the side walls of the channel diverging so as to provide an enlarged channel mouth permitting the strip to loosely embrace the mounting flange, the thereafter pressing the side walls towards each other into a subsequently generally parallel configuration in which the strip embracingly grips the mounting flange and is retained thereon solely by the resilience of the metal carrier and the frictional contact between the flexible material and the mounting flange.

* * * * *